(12) United States Patent
Sakaguchi

(10) Patent No.: US 6,289,020 B1
(45) Date of Patent: Sep. 11, 2001

(54) ATM DATA CONTROLLER

(75) Inventor: Tadahiko Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/196,738

(22) Filed: Nov. 20, 1998

(30) Foreign Application Priority Data

Nov. 21, 1997 (JP) .................................................. 9-336554

(51) Int. Cl.[7] .................................................. H04L 12/28
(52) U.S. Cl. .................. 370/395; 370/412; 370/429; 370/474; 370/477; 370/521; 375/241
(58) Field of Search .................................. 370/395, 389, 370/412, 474, 477, 413, 415, 429, 417, 463, 465, 466, 521; 375/240, 241

(56) References Cited

U.S. PATENT DOCUMENTS

| | | | |
|---|---|---|---|
| 5,420,858 | * 5/1995 | Marshall et al. | 370/395 |
| 5,450,399 | * 9/1995 | Sugita | 370/399 |
| 5,455,841 | * 10/1995 | Hazu | 375/240 |
| 5,831,981 | * 11/1998 | Tanimura et al. | 370/395 |
| 5,926,477 | * 7/1999 | Shirojura et al. | 370/395 |
| 5,940,407 | * 8/1999 | Tamura | 370/493 |
| 6,111,871 | * 8/2000 | Chen et al. | 370/349 |

FOREIGN PATENT DOCUMENTS

| | | |
|---|---|---|
| 7-202983 | 8/1995 | (JP) . |
| 9-55753 | 2/1997 | (JP) . |

* cited by examiner

Primary Examiner—Ricky Ngo
Assistant Examiner—Phuc Tran
(74) Attorney, Agent, or Firm—Foley & Lardner

(57) ABSTRACT

To prevent cell-delay-variation of ATM cells to be transmitted and to compress numeral data without increasing CPU load, an ATM data controller for controlling data exchange between a data processing system and an ATM interface comprises a first FIFO (3) for buffering transmission data supplied from and received data to be supplied to the data processing system, a third FIFO (7) for buffering transmission ATM cells and received ATM cells, and a second FIFO (5) for buffering transmission cell data to be assembled into the transmission ATM cells and received cell data obtained by disassembling the received ATM cells. When the transmission data is numeral data, a data compressing/decompressing means (4) compresses the transmission data by deleting upper four bits of every byte of the transmission data, and an ATM interface control section (6) sets a data-compression flag in the cell-header. When the data-compression flag is set in the cell-header of the received ATM cell, the data compressing/decompressing means (4) decompresses the received cell data by adding '0011' for every four bits of the received cell data.

8 Claims, 6 Drawing Sheets

ATM DATA CONTROLLER

BACKGROUND OF THE INVENTION

The present invention relates to an ATM data controller to be provided between an ATM (Asynchronous Transfer Mode) interface and a data processing system to be connected to the ATM interface, for controlling data exchange between the ATM interface and the data processing system, and particularly to the ATM data controller having a function for compressing and decompressing data to be exchanged between them.

In a Japanese patent application entitled "A Relay/Exchange System of Compressed Vocal Data in an ATM Network", laid open as a Provisional Publication No. 055753/'97, there is disclosed a prior art for reducing quality degradation and relaying delay of vocal data in a relay/exchange system connected to an ATM network wherein the vocal data are exchanged being compressed into low bit-rate digital data.

FIG. 8 is a block diagram illustrating the relay/exchange system of the prior art.

Referring to FIG. 8, a voice terminal 30, such as a telephone, is connected to an ATM network by way of a digital exchange 20, and a cell assembling/disassembling unit 10 is provided between the digital exchange 20 and the ATM network, which takes charge of compression/decompression of the vocal data together with assemble/disassemble of ATM cells. A cell assembling/disassembling unit having the same configuration with the cell assembling/disassembling unit 10 is provided for each pair of trunk lines (not depicted in the drawings) of the digital exchange 20.

The cell assembling/disassembling unit 10 comprises a CDV (Cell-Delay-Variation) absorbing buffer 111 for buffering ATM cells received from the ATM network, a CDV absorption controller 112, a cell disassembling section 113, a decompression section 114 and a first selector 115. The cell disassembling section 113 reproduces compressed digital vocal data by disassembling ATM cells read out from the CDV absorbing buffer 111. The decompression section 114 decompresses the compressed digital vocal data into digital vocal data. The first selector selects data to be transferred to the digital exchange 20 from either of the digital vocal data outputted from the decompression section 114 or the ATM cells directly read out from the CDV absorbing buffer 111.

The cell assembling/disassembling unit 10 also comprises a compression section 121, a cell assembling section 122, a second selector 123, and a relay/exchange detection section 131. The compression section 121 compresses digital vocal data supplied from the digital exchange 20 into compressed digital vocal data of a low bit rate, which is assembled into ATM cells by the cell assembling section 122. The second selector 123 selects data to be transmitted to the ATM network from either of ATM cells assembled by the cell assembling section 122 or the data directly supplied from the digital exchange 20.

The relay/exchange detection section 131 takes charge of discriminating whether the data supplied from the digital exchange 20 is the data originated from a voice terminal 30 accommodated in the digital exchange, or the data relayed by another digital exchange by way of the ATM network, and controls the first and the second selector 115 and 123 according to the discrimination result.

When the data supplied from the digital exchange 20 is found to be the data relayed from another digital exchange through the ATM network, the relay/exchange detection section 131 controls the first selector 115 to select ATM cells directly read out from the CDV absorbing buffer 111 and the second selector 123 to select the data supplied directly from the digital exchange 20, because the ATM cells received from the ATM network are also to be relayed to the other digital exchange through the ATM network.

Thus, unnecessary decompression and compression of the vocal data to be relayed by the digital exchange 20 from the ATM network to the ATM network are avoided, and the quality degradation and the relaying delay of the vocal data are prevented, in the relay/exchange system according to the prior art.

However, there are problems in the prior art of FIG. 8, when it is applied as an ATM data controller for controlling data exchange between an ATM interface and a data processing system to be connected to the ATM interface.

A first problem is that the transmission efficiency of the ATM network cannot be made high because the cell assembling/disassembling unit 10 of FIG. 8 has no CDV-absorbing buffer for buffering ATM cells to be transmitted to the ATM network. When the data supplied from the digital exchange 20 is the digital vocal data originated from the voice terminal 30, it is assembled into ATM cells after compressed by the compressing section 121 according to the recommendation G. 728 of the ITU-T standard, for example. Therefore, a time interval for the data compression is needed after a cell is transmitted until a next cell is prepared, which makes low the transmission efficiency of the ATM network.

A second problem is that operational load of a CPU of the ATM data controller becomes high, because such data compression/decompression as above described is usually implemented by a software program executed by the CPU, when the ATM data controller performs the data compression/decompression between the data processing system and the ATM interface. Therefore, the operational load of the CPU taken by the data compression/decompression may obstruct other processing to be performed by the CPU.

A third problem is that transmission rate of data other than the vocal data is limited within the cell-transfer-rate of the ATM network, because the cell assembling/disassembling unit 10 of FIG. 8 has 110 means for compressing or decompressing data other than the digital vocal data.

SUMMARY OF THE INVENTION

Therefore, a primary object of the present invention is to provide an ATM data controller for controlling data exchange between an ATM interface and a data processing system to be connected to the ATM interface, whereby ATM cells are assembled and disassembled without degrading transmission efficiency of the ATM network and numeral data is compressed and decompressed without needing CPU load.

In order to achieve the object, an ATM data controller of the invention for controlling data exchange between a data processing system and an ATM interface comprises:

a first data buffer for buffering transmission data supplied from and received data to be supplied to the data processing system;

a third data buffer for buffering transmission ATM cells to be transmitted to and received ATM cells received from the ATM interface;

a second data buffer for buffering transmission cell data to be assembled into the transmission ATM cells and received cell data obtained by disassembling the received ATM cells;

a data compressing/decompressing means for compressing the transmission data into the transmission cell data when the data compressing/decompressing means is controlled to compress the transmission data, controlling the second data buffer to buffer the transmission cell data supplied from the data compression/decompression means when the data compressing/decompressing means is controlled to compress the transmission data and to buffer the transmission data directly outputted from the first data buffer when the data compressing/decompressing means is not controlled to compress the transmission data, and decompressing the received cell data supplied from the second data buffer into the received data when the data compressing/decompressing means is controlled to decompress the received cell data;

an ATM interface control section for assembling the transmission ATM cells by adding cell-headers onto the transmission cell data, in the cell-headers data-compression flags being set when the ATM interface control section is controlled to set the data-compression flags, disassembling the received ATM cells into the received cell data by deleting cell-headers from the received ATM cells, and controlling the second data buffer to output the received cell data towards the data compressing/decompressing means when the data-compression flags are set in the cell-headers of the received ATM cells and to output the received cell data towards the first data buffer when the data-compression flags are not set in the cell-headers; and a control section for controlling the data compressing/decompressing means to compress the transmission data and the ATM interface control section to set the data-compression flags, when the transmission data is to be compressed.

The data compression is performed when the transmission data is a unit of numeral data, and the data compressing/decompressing means compresses the transmission data by deleting upper four bits from each byte of the transmission data, and decompresses the received cell data by adding four bits of a bit-pattern '0010' to every four bits of the received cell data as upper four bits of every byte of the received data whereto the received cell data is to be decompressed.

The data compressing/decompressing means can be easily realized with a simple hardware logic circuit. Therefore, the compressing/decompressing of the numeral data can be performed without increase of CPU load of the data processing system, enabling to heighten two times the substantial data-transmission-rate of the numeral data.

Further more, by providing the third data buffer for absorbing cell-delay-variations of the ATM cells to be transmitted to the ATM interface as well as the cell-delay-variations of the received ATM cells, stable data exchange between the data processing system and the ATM interface can be performed.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
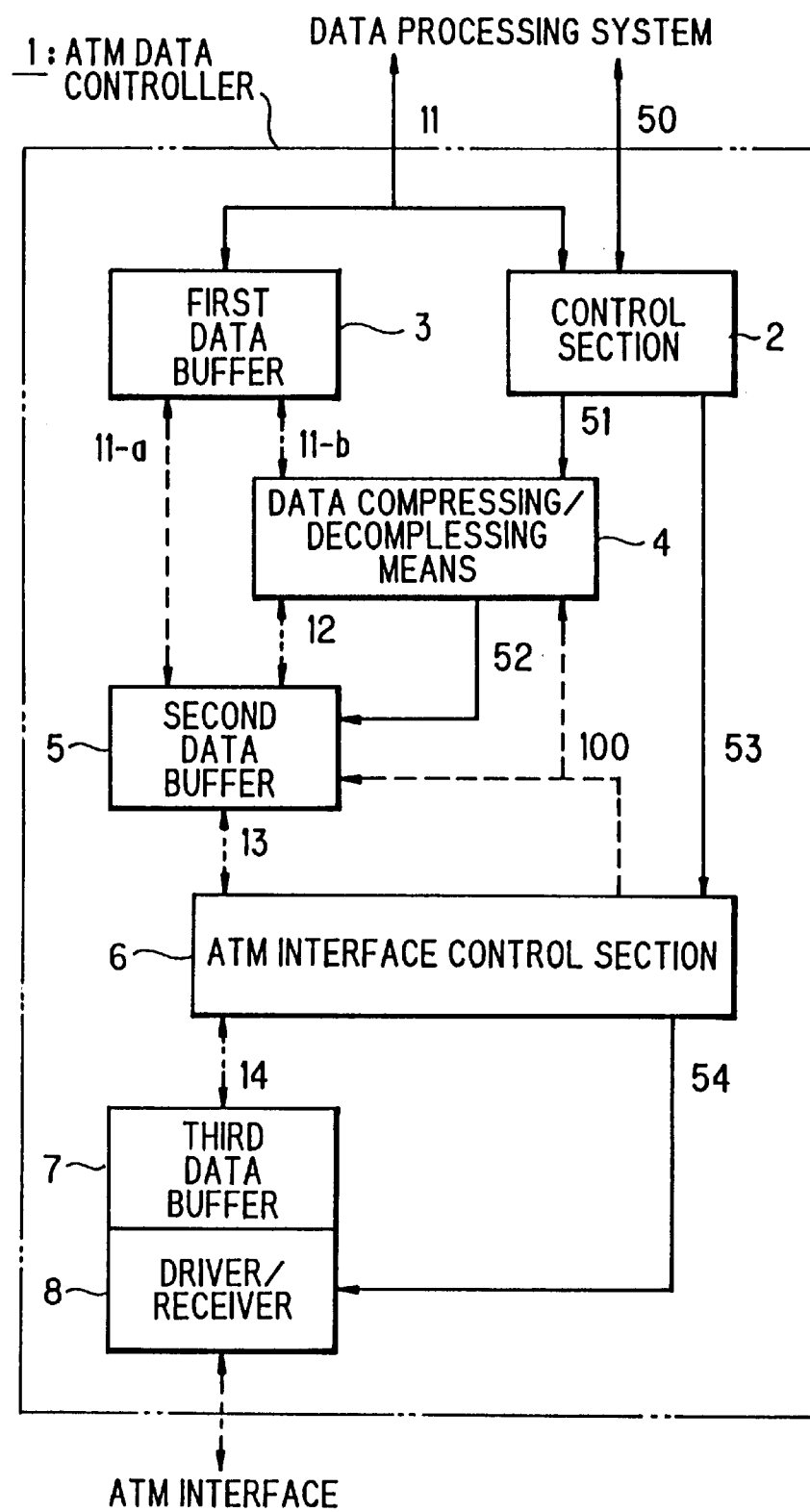
FIG. 1 is a block diagram illustrating an ATM data controller 1 according to an embodiment of the invention.

FIG. 1 is a block diagram illustrating an ATM data controller 1 according to an embodiment of the invention.

The ATM data controller 1 comprises a control section 2, a first data buffer 3, a data compressing/decompressing means 4, a second data buffer 5, an ATM interface control section 6, a third data buffer 7, and a driver/receiver 8.

The control unit 2 realizes data exchange between an ATM interface by controlling the data compressing/decompressing means 4 and the ATM interface control section 6. The first data buffer 3 buffers data supplied from and to be delivered to a data processing system through a data line 11. The first data buffer 3 stores the data with a unit of 96 bytes, and exchanges the data with the second data buffer 5 through a data line 11-a and with the data compressing/decompressing means 4 through a data line 11-b.

Being controlled by the control section 2 through a control line 51, the data compressing/decompressing means 4 takes charge of compressing transmission data read out from the first data buffer 3 and storing the compressed data into the second data buffer 5, when data transmission to the ATM interface is performed. When data is being received from the ATM interface, the data compressing/decompressing means 4 performs decompression of received data buffered in the second data buffer 5 and stores the decompressed data into the first data buffer 3, being controlled by the ATM interface control section 6.

The second data buffer 5 is provided for buffering data to be transmitted to the ATM interface or data received from the ATM interface with a unit of 48 bytes, that is, a data length of an ATM cell without cell-header.

When the data buffered in the second data buffer 5 are to be transmitted to the ATM interface, the ATM interface control section 6 assembles ATM cells by adding a cell-header of 5 bytes to each data set of 48 bytes read out from the second data buffer 5. Here, the ATM interface control section 6 sets a data-compression-flag in a PTI (Payload Type Identifier) field of the cell-header, when it is indicated from the control section 2 by enabling a control line 53 that the data buffered in the second data buffer 5 are compressed data.

The ATM cells thus assembled are transmitted to the ATM interface through the third data buffer 7 and the driver/receiver 8.

When the data-compression-flag is found in the cell-header of an ATM cell received from the ATM interface, the ATM interface control section 6 indicates data decompression to the second data buffer 5 and the data compressing/decompressing means 4 through a control line 100.

The third data buffer 7, which stores data with a unit of cell length of 53 bytes, is provided for absorbing cell-delay variation (CDV) of ATM cells to be transmitted to or received from the ATM interface.

Now, operation of the ATM data controller 1 of FIG. 1 is described.

First, transmission of numeral data, that is, data to be compressed, is described.

Receiving a data-transmission request to the ATM interface and a data-compression permission from the data processing system through a control line 50, the control section 2 indicates compression of the data to be transferred from the first data buffer 3 to the data compressing/decompressing means 51 through the data line 11-b, by enabling the control line 51, and indicates setting of the data-compression-flag in the PTI field of the cell-header to be added to the data transferred from the second data buffer 5 to the ATM interface control section 6 through a data line 13, by enabling the control line 53.

Receiving the indication of the control section 2, the data compressing/decompressing means 4 compresses the transmission data by omitting upper 4 bits of every byte of the transmission data supplied through the data line 11-b. Thus, a data set of 96 bytes outputted from the first data buffer 3 is compressed into a data set of 48 bytes to be stored in the second data buffer 5.

When there is prepared at least one data set in the second data buffer 5, the ATM interface control section 6 makes a cell-header setting the data-compression-flag therein, and transfers the data set from the second data buffer 5, set by set, into the third data buffer 7 adding the cell-header thereto, which is transmitted to the ATM interface by the driver/receiver 8, sequentially in order.

When data other than numeral data is to be transmitted, data-transmission request is sent through the control line 50 from the data processing system without data-compression permission. The control section 2 disables the control lines 51 and 53.

Hence, the data compressing/decompressing means 4 stops to perform the data compression, and a data set of 96 bytes outputted from the first data buffer 3 is transferred through another data line 11-a and stored in the second buffer 5 divided into two data sets of 48 bytes.

The ATM interface control section 6 makes a cell-header of 5 bytes without setting the data-compression flag, and transfers the data set from the second data buffer 5, set by set, into the third data buffer 7 adding the cell-header thereto, which is transmitted to the ATM interface by the driver/receiver 8, sequentially in order, in the same way.

Now, data receiving from the ATM interface is described.

ATM cells received from the ATM interface are sent through the third data buffer 7 to the ATM interface control section 6, wherein cell-headers are analyzed. When the data-compression flag is found in the cell-header, the ATM interface control section 6 enables a control line 100, whereby a selector in the second data buffer 5 is controlled to output data stored in the second data buffer towards the data compressing/decompressing means 4 through a data line 12, and the data compressing/decompressing means 4 is controlled to perform decompression of the received data.

The ATM cells are disassembled into data sets of 48 bytes by the ATM interface control section 6 and stored in the second data buffer 5 through the data line 13, to be transferred to the data compressing/decompressing means 4 through the data line 12.

The data compressing/decompressing means 4 performs decompression of the data sets of 48 bytes into data sets of 96 bytes to be stored in the first data buffer 3, set by set, by adding a numeral code '0011' as upper four bits to every four bits of the data sets of 48 bytes transferred from the second data buffer 5.

When the data-compression flag is not found in the cell-header, the ATM interface control section 6 disables the control line 100, whereby the selector in the second data buffer 5 is controlled to output the data sets of 48 bytes through the data line 11-a, and every two data sets of 48 bytes transferred through the control line 11-a are stored in the first data buffer 3 as a data set of 96 bytes, set by set, to be outputted through the data line 11 to the data processing system.

As heretofore described, when the data to be transmitted from or received by the data processing system are numeral data, they are compressed or decompressed by the data compressing/decompressing means 4, mid the data compressing/decompressing means 4 can be easily realized with a simple hardware logic circuit. Therefore, the compressing/decompressing of the numeral data can be performed without increase of CPU load of the data processing system, according to the embodiment, enabling to heighten two times the substantial data-transmission-rate of the numeral data.

Further, by providing the third data buffer 7 for absorbing the cell-delay variation of the ATM cells to be transmitted to the ATM interface as well as the cell-delay variation of received ATM cells, stable data exchange between the data processing system and the ATM interface can be performed.

In the following paragraphs, more concrete examples of the embodiment will be described.

Figure 2:
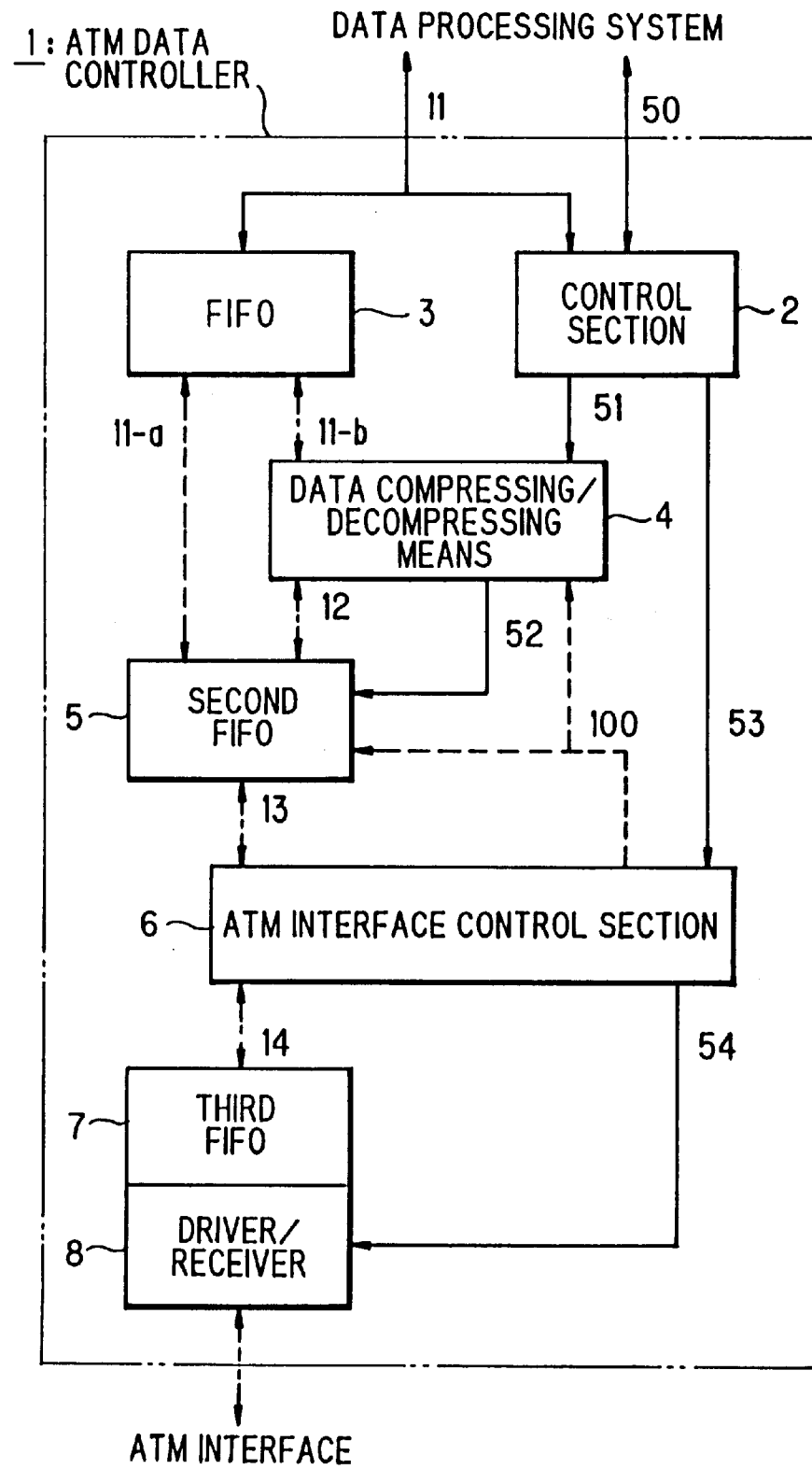
FIG. 2 is a block diagram illustrating a configuration example of the ATM data controller of FIG. 1.

FIG. 2 is a block diagram illustrating a configuration example of the ATM data controller of FIG. 1. In the example of FIG. 2, the first, the second and the third data buffer 3, 5 and 7 of FIG. 1 are realized by a first, a second and a third FIFO (First-In First-Out memory) 3, 5 and 7, and a selector is provided to the second FIFO 5, in the same way with FIG. 1. Making use of the selector, the second FIFO 5 performs data exchange with the data compressing/decompressing means 4 through the data line 12 when the control line 52 or the control line 100 is enabled, and otherwise performs the data exchange with the first FIFO 3 through the data line 11-a. Other parts are the same with those of the embodiment of FIG. 1 and duplicated description is omitted.

Figure 3:
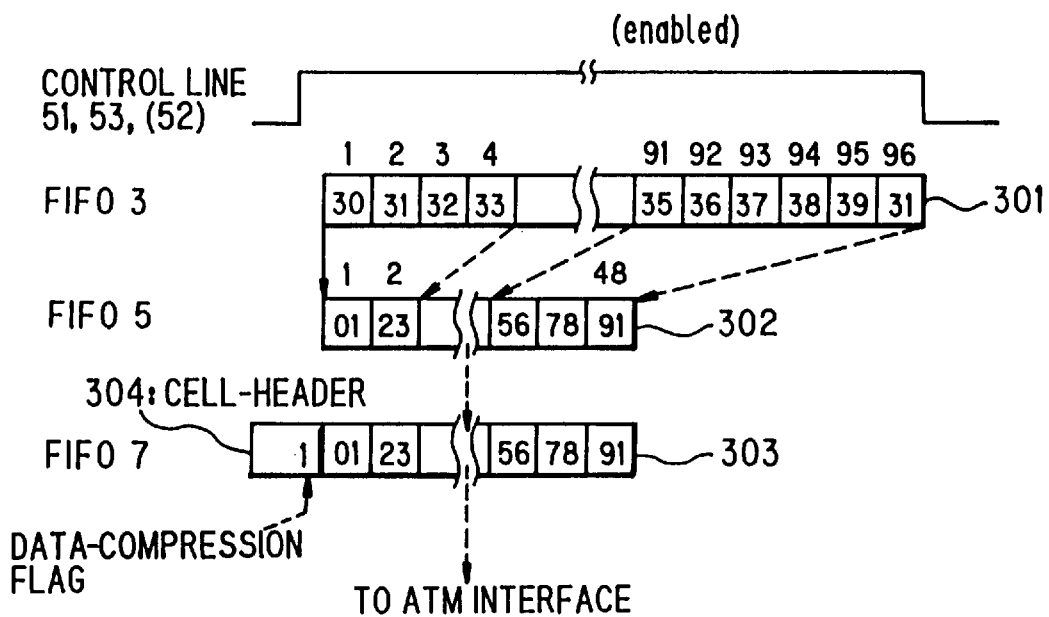
FIG. 3 is a schematic diagram illustrating compression of numeral data to be transmitted to the ATM interface.
Figure 4:
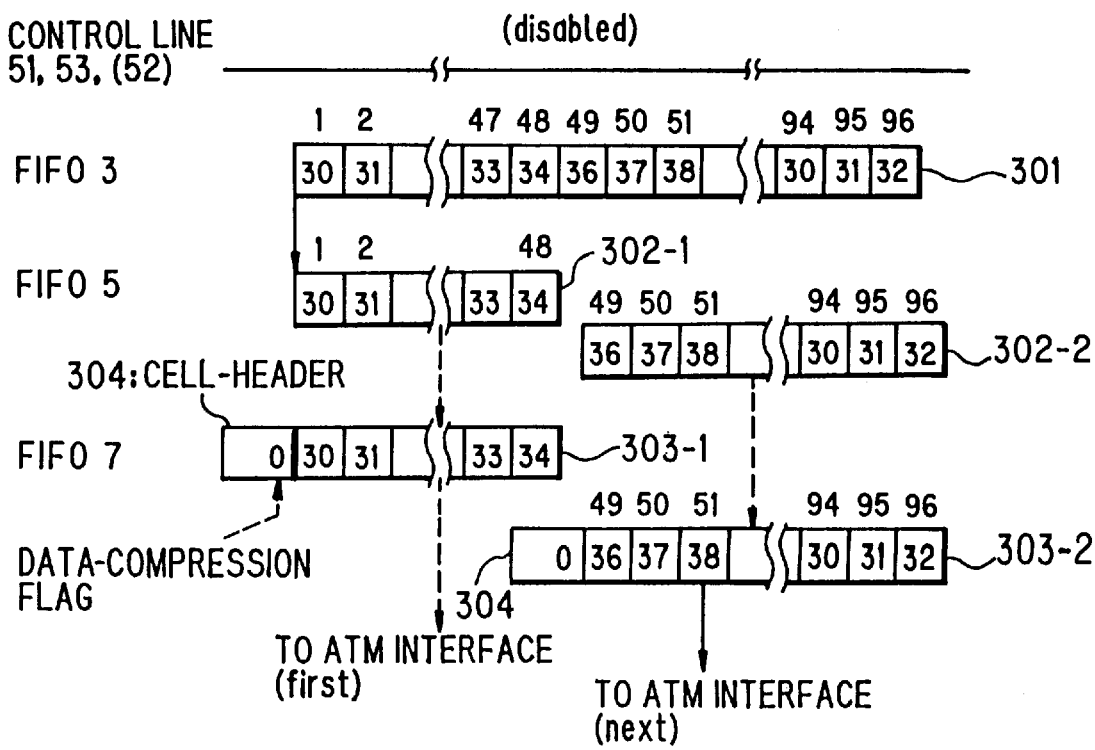
FIG. 4 is a schematic diagram illustrating a case where numeral data to be transmitted is not compressed.
Figure 6:
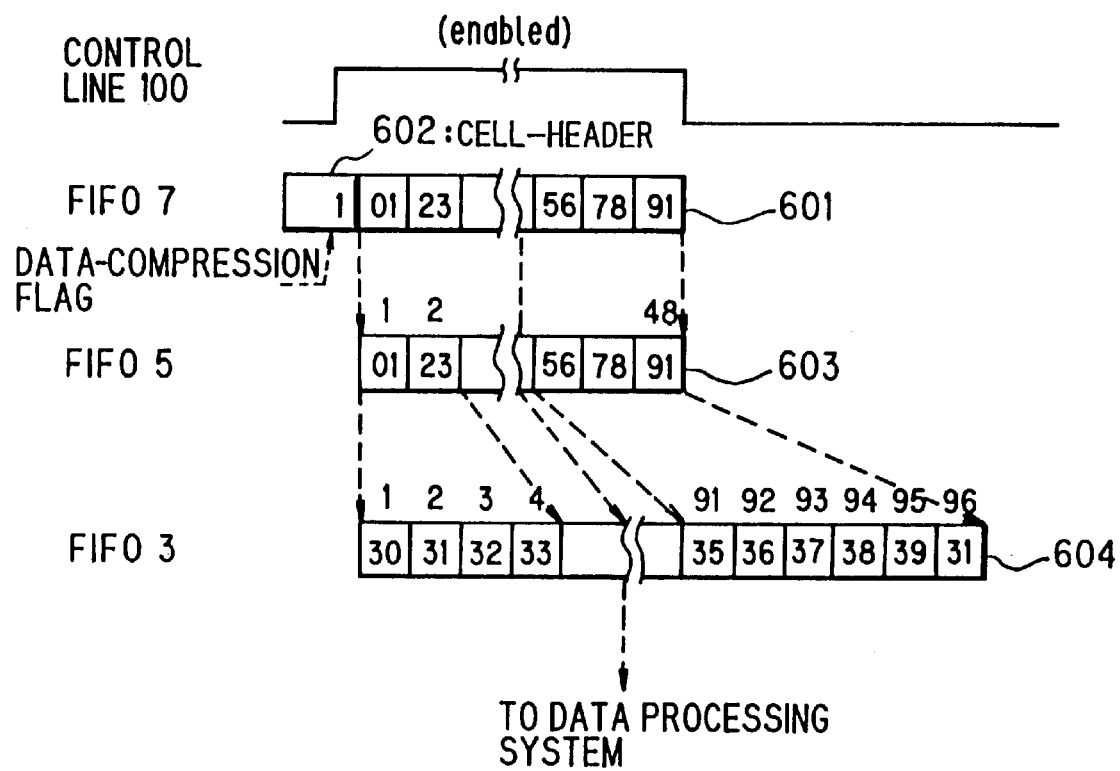
FIG. 6 is a schematic diagram illustrating decompression of received data.

FIGS. 3, 4 and 6 are schematic diagrams illustrating transition of data format of data stored ill the first, second and the third FIFO 3, 5 and 7 when numeral data is compressed or decompressed, wherein FIG. 3 represents compression of numeral data to be transmitted to the ATM interface, FIG. 4 represents a case where numeral data to be transmitted is not compressed, and FIG. 6 represents decompression of received data.

Figure 5:
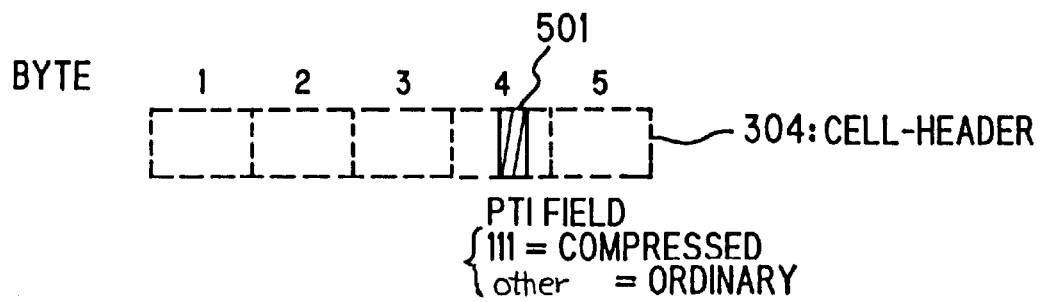
FIG. 5 shows a data-compression flag to be set in cell-headers.

FIG. 5 shows the data-compression flag of FIGS. 3, 4 and 6, being set in the cell-headers.

Receiving the data-transmission request to the ATM interface and the data-compression permission from the data processing system through a control line 50, the control section 2 indicates compression of the data to be transferred from the first FIFO 3 through the data line 11-b to the data compressing/decompressing means 51 by enabling the control line 51, and at the same time, indicates setting of the data-compression-flag in the PTI field of the cell-header to be added to the data transferred from the second FIFO 5 through the data line 13 to the ATM interface control section 6 by enabling the (control line 53, as shown in FIG. 3.

Receiving the indication of the control section 2 by way of the control line 51, the data compressing/decompressing means 4 compresses the transmission data of 96 bytes supplied through the data line 11b into a data set of 48 bytes to be stored in the second FIFO 5, by omitting upper 4 bits of every byte of the transmission data.

In FIG. 3, a data set 301 of 96 bytes, having hexadecimal codes '30', '31', '32', . . . , for example, is buffered. Being numeral data, every hexadecimal code begins with '3', that is, every byte has upper four bits of '0011'. Therefore, even when upper four bits are omitted from every byte, they can be added afterwards by referring to a data-compression flag to be set in the cell header.

As shown in FIG. 3, from each of first two bytes '30' and '31' in hexadecimal of the 96-byte data set 301 in the first FIFO 3, upper four bits '3' are omitted and lower four bits '0' and '1' of the two bytes are connected into the first byte of '01' of a 48-byte data set 302 to be stored in the second FIFO 5. In the same way, the second byte '23' of the 48-byte data set 302 is made of lower four bits of the third and the fourth bytes '32' and '33' of the 96-byte data set 301.

When a 48-byte data set 302 is prepared in the second FIFO 5 by repeating the above process, the ATM interface control section 6 prepares a cell-header 304 setting the data-compression flag '111' in the PTI field 501 of the cell-header 304, as shown in FIG. 5, which is added to the 48-byte data set 302 and stored in the third FIFO 7 as an ATM cell 303 of FIG. 3 to be transmitted by the driver/receiver 8 to the ATM interface.

When the data-transmission request is sent from the data processing system without data-compression permission, the control section 2 disables the control lines 51 and 53, for controlling the data compressing/decompressing means 4 and the ATM interface control section 6 in a non-compression mode.

In the case, the 96-byte data set 301 of the first FIFO 3 is transferred to the second FIFO 5 through the data line 11-a, and stored therein being divided into two 48-byte data sets 302-1 and 302-2, as illustrated in FIG. 4, whereof each is added with a cell-header 304 having the PTI field of '000' and stored in the third FIFO 7 to be transmitted to the ATM interface.

Now, operation of the ATM data controller 1 receiving compressed data is described referring to FIG. 6.

The received cell data 601 buffered in the third FIFO 7 is transferred to the ATM interface control section 6 for analyzing at cell-header 602 thereof. When the data-compression flag is found to be set in the cell-header 602, the ATM interface control section 6 enables the control line 100, as illustrated in FIG. 6, whereby the selector of the second FIFO 5 is controlled to output data sets to the data compressing/decompressing means 4 by way of the data line 12, and the data compressing/decompressing means 4 is controlled to perform decompression of the data sets.

Deleting the cell-header 602, the ATM interface control section 6 transfers the received cell data 601 through the data line 13 into the second FIFO 5 as a 48-byte data set 603, which is further transferred to the data compressing/decompressing means 4 through the data line 12.

The data compressing/decompressing means 4 decompress the 48-byte data set 603 into a 96-byte data set 604 to be stored in the first FIFO 3 by adding upper four bits '0011' to every four-bit data of the 48-byte data set 603.

In an example of FIG. 6, the first byte '01' in hexadecimal of the 48-byte data set 603 is divided into two times lower four bits and decompressed into first two bytes '30' and '31' of the 96-byte data set 604, each being added with upper four bits '0011'.

Figure 7:
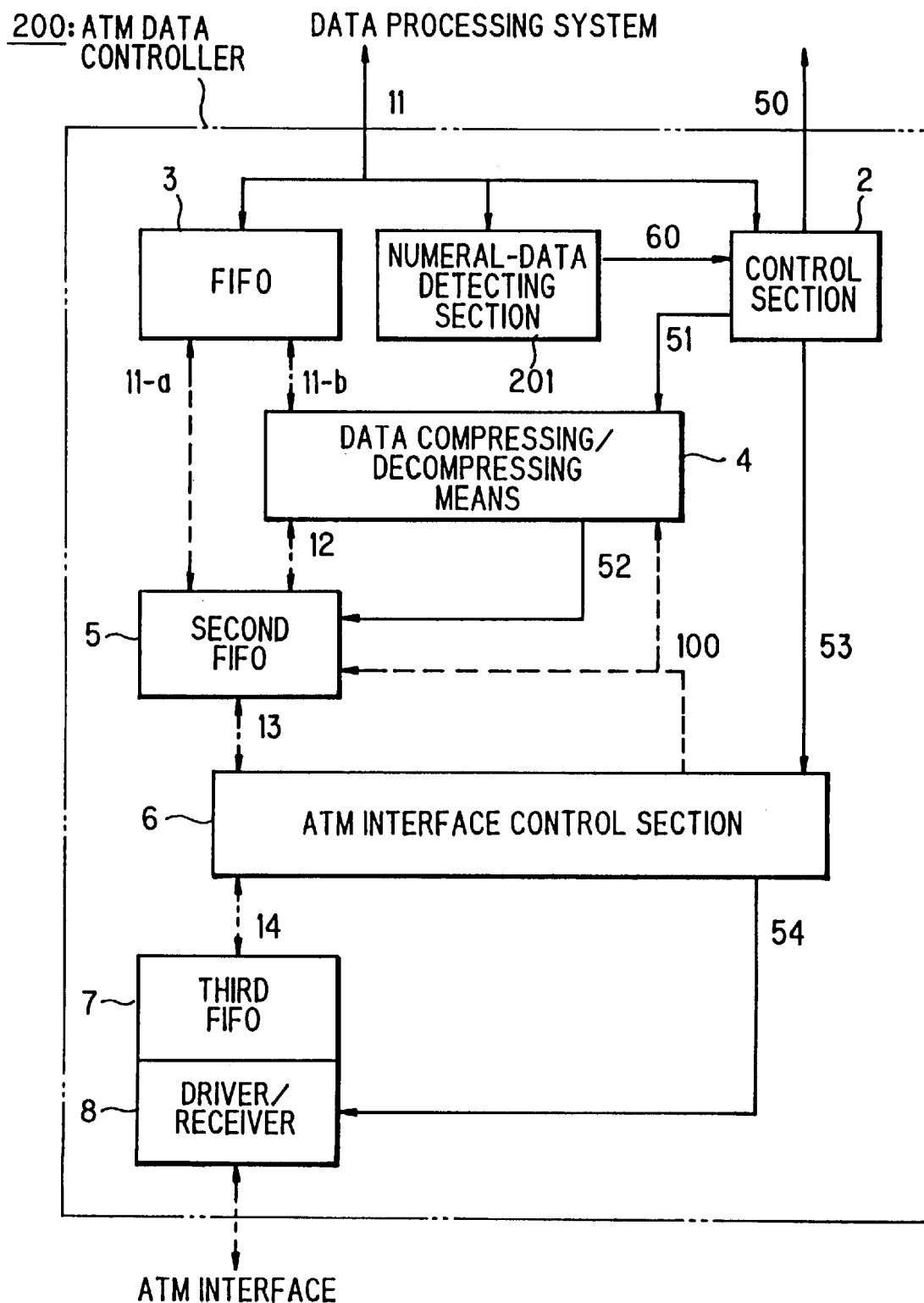
FIG. 7 is a block diagram illustrating another example of the ATM data controller according to the invention.
Figure 8:
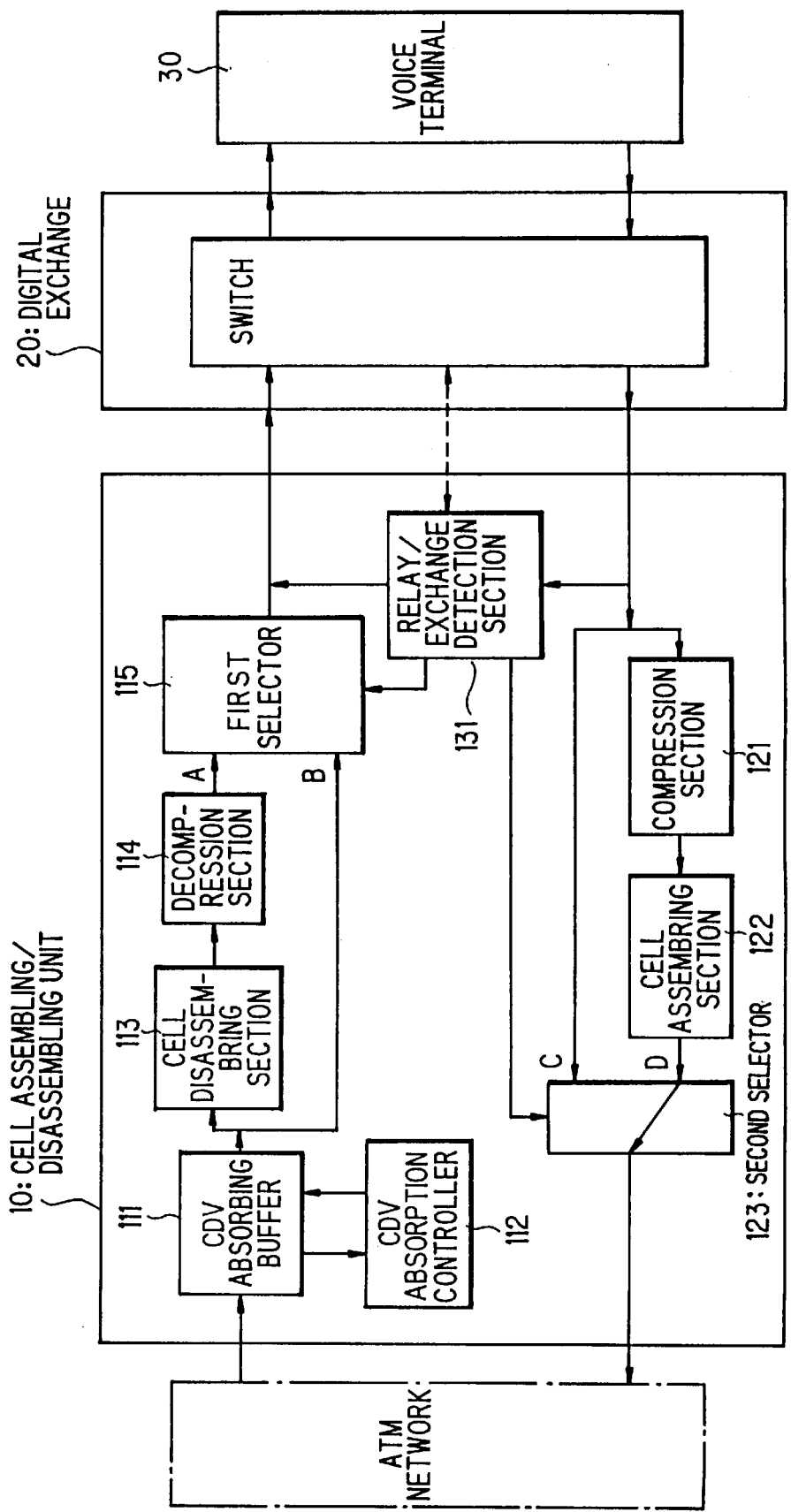
FIG. 8 is a block diagram illustrating the relay/exchange system of a prior art.

FIG. 7 is a block diagram illustrating another example of the ATM data controller according to the invention. In the ATM data controller 200 of FIG. 7, a numeral-data detecting section 201 is further comprised in addition to the ATM data controller 1 of FIG. 2.

The numeral-data detecting section 201 monitors the transmission data supplied from the data processing system 48 bytes by 48bytes. When all the 48 bytes are detected to be numeral data by checking upper four bits of every 48 bytes, the numeral-data detecting section 201 enables a control line 60, whereby the control section 2 enables the control lines 51 and 53. Therefore, compression of numeral data is performed automatically without any compression permission which was indicated by the data processing system through the control line 50 in the example of FIG. 2, and hence, the CPU load of the data processing system is further lightened in the ATM data controller 200 of FIG. 7, compared to the ATM data controller 1 of FIG. 2.

What is claimed is:

1. An ATM data controller for controlling data exchange between a data processing system and an ATM interface; the ATM data controller comprising:

a first data buffer for buffering transmission data supplied from and received data to be supplied to the data processing system;

a third data buffer for buffering transmission ATM cells to be transmitted to and received ATM cells received from the ATM interface;

a second data buffer for buffering transmission cell data to be assembled into the transmission ATM cells and received cell data obtained by disassembling the received ATM cells;

a data compressing/decompressing means for compressing the transmission data into the transmission cell data when the data compressing/decompressing means is controlled to compress the transmission data, controlling the second data buffer to buffer the transmission cell data supplied from the data compression/decompression means when the data compressing/decompressing means is controlled to compress the transmission data and to buffer the transmission data directly outputted from the first data buffer when the data compressing/decompressing means is not controlled to compress the transmission data, and decompressing the received cell data supplied from the second data buffer into the received data when the data compressing/decompressing means is controlled to decompress the received cell data;

an ATM interface control section for assembling the transmission ATM cells by adding cell-headers onto the transmission cell data, in the cell-headers data-compression flags being set when the ATM interface control section is controlled to set the data-compression flags, disassembling the received ATM cells into the received cell data by deleting cell-headers from the received ATM cells, and controlling the second data buffer to output the received cell data towards the data compressing/decompressing means when the data-compression flags are set in the cell-headers of the received ATM cells and to output the received cell data towards the first data buffer when the data-compression flags are not set in the cell-headers; and a control section for controlling the data compressing/decompressing means to compress the transmission data and the ATM interface control section to set the data-compression flags, when the transmission data is to be compressed.

2. An ATM data controller as recited in claim 1; wherein the control section determines whether the transmission data is to be compressed or not according to indication of the data processing system.

3. An ATM data controller as recited in claim 1; wherein:

a numeral-data detecting section is further comprised for detecting whether the transmission data is a unit of 96 bytes of numeral data or not; and the control section determines whether the transmission data is to be compressed or not according to a detection result of the numeral-data detecting section.

4. An ATM data controller as recited in claim 3; wherein a numeral-data detecting section detects that the transmission data is the unit of 96 bytes of numeral data when upper four bits of every of the 96 bytes compose a bit-pattern of '0011' expressed in binary.

5. An ATM data controller as recited in claim 1; wherein:

a FIFO (First-In First-Out) memory is employed for each of the first, the second and the third data buffer; and a selector is provided to the second data buffer for selecting one of two in/out terminals of the second data buffer for inputting the transmission cell data and outputting the received cell data, one of the two in/out terminals connected to the first data buffer and the other connected to the data compressing/decompressing means.

6. An ATM data controller as recited in claim 1; wherein:

the first data buffer buffers the transmission data and the received data by a unit of 96 bytes; and the second data buffer buffers the transmission cell data and the received cell data by a unit of 48 bytes.

7. An ATM data controller as recited in claim 1; wherein the data compressing/decompressing means compresses the transmission data by deleting upper four bits from each byte of the transmission data, and decompresses the received cell data by adding four bits of a fixed bit-pattern to every four bits of the received cell data as upper four bits of every byte of the received data whereto the received cell data is to be decompressed.

8. An ATM data controller as recited in claim 7; wherein the fixed bit-pattern is a bit-pattern of '0011' expressed in binary.

* * * * *